Patented Apr. 20, 1926.

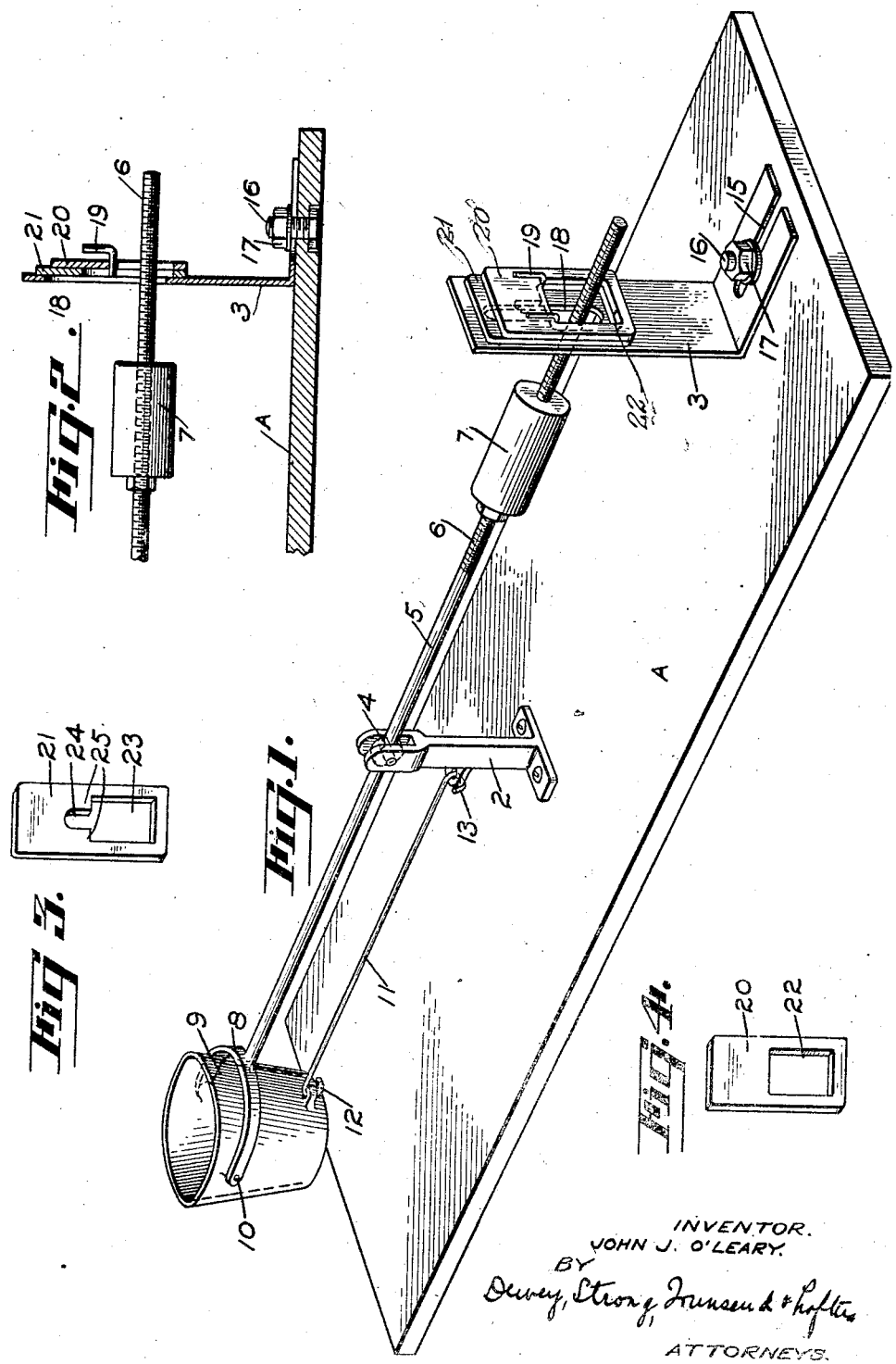

1,581,468

UNITED STATES PATENT OFFICE.

JOHN J. O'LEARY, OF SEBASTOPOL, CALIFORNIA.

EGG SCALE.

Application filed May 7, 1924. Serial No. 711,612.

*To all whom it may concern:*

Be it known that I, JOHN J. O'LEARY, a citizen of the United States, residing at Sebastopol, county of Sonoma, and State of California, have invented new and useful Improvements in Egg Scales, of which the following is a specification.

This invention relates to scales, and especially to that type employed for the purpose of weighing eggs.

Eggs such as sold by the poultry producers are generally graded into three grades known as pullets, medium and heavy. The producers usually grade the eggs before they dispose of them to the wholesalers or retailers and it is therefore important that an efficient and fairly accurate scale be employed for this purpose as the eggs must be picked up and weighed one by one.

A number of scales are in use at the present time and single scales may be bought which will weigh two or three grades, as the case may be, but they are not popular as it is usually necessary to re-adjust the scale for each grade and as such is the case valuable time is lost. The majority of producers therefore employ several independent scales and place the same side by side or within convenient reach, and they rely more or less upon experience and good judgment to determine on which scale each egg should be placed when picked up. Mistakes are, however, made by the best of operators, and if an egg proves over or under weight when placed on one scale, it must again be picked up and placed on another scale, thus requiring re-handling of the eggs from time to time.

The present invention contemplates a single scale which will automatically adjust itself to two or more grades, thus eliminating adjustments or the use of two or more scales with consequent loss of time, etc.

The invention specifically stated embodies a scale beam, a receptacle carried by one end thereof for the reception of the eggs, a guide for the opposite end of the beam, and a plurality of weights carried thereby and adapted to be successively engaged and raised by the beam to indicate the weight or grade of each egg.

One form which my invention may assume is exemplified in the following description and illustrated in the accompanying drawings, in which—

Fig. 1 is a perspective view of the egg scale.

Fig. 2 is a detail sectional view of one end of the scale showing the position of the weights which are successively engaged and elevated by the scale beam.

Fig. 3 is a perspective view of one of the weights.

Fig. 4 is a perspective view of another of the weights.

Referring to the drawings in detail, and particularly to Fig. 1, A indicates a base plate upon which are mounted bearing bracket 2 and a scale beam guide 3. Pivotally mounted in the bearing bracket at the point 4 is a scale beam 5. One end of the scale beam is threaded as at 6 to receive an adjustable weight 7, while the other end of the beam is fork shaped as indicated at 8 to receive a cone shaped receptacle 9 in which the eggs are placed one by one when being weighed. This receptacle is pivotally mounted as at 10 in the forks of the beam and the lower end of the receptacle is connected to the bearing bracket 2 by means of a link 11 to maintain the receptacle in a vertical position, the link 11 being pivotally connected at its respective ends to the receptacle and the bearing bracket as indicated at 12 and 13 to permit a free movement when the scale beam is in operation.

The scale beam guide is nothing more or less than an angle plate. Its base portion is slotted as shown at 15 to permit a bolt 16 to pass therethrough. This bolt carries a clamping nut 17 which engages the scale beam guide and thereby secures the same to the base. The slot 15 permits adjustment of the scale beam guide longitudinally of the scale beam, this being more or less important as it forms one of the means whereby the scale may be sensitively adjusted. The upright portion of the scale beam guide is longitudinally slotted as indicated at 18. The threaded end of the beam extends through this slot and is guided thereby, the slot serving the function of limiting the range of movement of the free end of the scale beam. Secured to the rear side of the scale beam guide is a pair of hook like fingers 19, and supported thereby is a pair of weights 20 and 21.

The weight 20 has a rectangular shaped opening formed therein as shown at 22 and this permits a predetermined range of movement as far as the scale beam is concerned before the weight is engaged and elevated by the beam. The second weight, indicated at 21, is similarly provided with a rectangular shaped opening 23, but the upper end of this opening is narrowed down and slightly extended as shown at 24, first, to form a pair of shoulders 25, by which the weight may be supported on the fingers 19, and, secondly, to permit a further movement of the scale beam before the weight is engaged and elevated.

The operation will be as follows:

With the counterweight 7 properly adjusted and the weights 20 and 21 in position on the fingers 19, it will only be necessary for the operator to place the eggs one by one in the receptacle 9. If a pullet or light weight egg is placed in the receptacle, beam 5 will move upwardly in the slot 18 and will stop when it engages the weight 20. If a medium weight egg is placed in the receptacle, the beam again moves upwardly until it engages the weight 20. It will then raise the weight 20 and it will continue moving until it engages the weight 21, when it will stop. If a heavy weight egg is placed in the receptacle, beam 5 again swings upwardly and both of the weights 20 and 21 will be raised.

From this it can be seen that movement of the weights visibly indicates the grade of the egg, as no movement of the weights indicates a pullet or light weight egg. Movement of weight 20 indicates a medium weight egg, and movement of both weights indicates a heavy weight egg.

No adjustments are required once the counterweight 7 and the scale beam guide have been properly adjusted, and the operator will thus eliminate the loss of time and mistakes, as each grade is visibly and automatically indicated by the movement or non-movement of the weights 20 and 21.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A device of the character described, comprising a base member, a bearing bracket mounted thereon, a scale beam pivotally supported in the bracket, a receptacle carried by one end of the beam for the reception of eggs to be weighed, a slotted bracket secured to the base through which the opposite end of the beam projects, and a plurality of weights supported thereby, said weights having slots formed therein through which the scale beam extends, and the slots of each weight being of increasing length to permit the scale beam to successively engage and elevate the weights.

2. A device of the character described, comprising a base member, a bearing bracket mounted thereon, a scale beam pivotally supported in the bracket, a receptacle carried by one end of the beam for the reception of eggs to be weighed, a slotted bracket secured to the base through which the opposite end of the beam projects, a pair of fingers on said bracket, a plurality of weights supported thereby and adapted to be successively engaged and elevated by movement of the scale beam, an adjustable weight on the scale beam, and means permitting longitudinal adjustment of the slotted bracket and the weights carried thereby with relation to the scale beam.

3. An egg scale comprising a pivotally supported scale beam, means on one end thereof for receiving the eggs to be weighed, a slotted bracket through which the opposite end of the beam projects, a pair of fingers on said bracket, and a plurality of weights supported by said fingers, said weights having slots formed therein through which the scale beam extends and the slots in each weight being of increasing length to permit the scale beam to successively engage and elevate the weights.

JOHN J. O'LEARY.